(12) United States Patent
Tredoux et al.

(10) Patent No.: US 7,634,551 B2
(45) Date of Patent: Dec. 15, 2009

(54) SYSTEM AND METHOD FOR FORMING A CLUSTER OF NETWORKED DEVICES

(75) Inventors: Gavan Leonard Tredoux, Penfield, NY (US); Alan Thomas Coté, Walworth, NY (US)

(73) Assignee: Xerox Corporation, Stamford, CT (US)

( * ) Notice: Subject to any disclaimer, the term of this patent is extended or adjusted under 35 U.S.C. 154(b) by 775 days.

(21) Appl. No.: 11/296,024

(22) Filed: Dec. 7, 2005

(65) Prior Publication Data

US 2007/0133040 A1    Jun. 14, 2007

(51) Int. Cl.
*G06F 15/177* (2006.01)
(52) U.S. Cl. .................. 709/220; 709/221; 709/222
(58) Field of Classification Search .............. None
See application file for complete search history.

(56) References Cited

U.S. PATENT DOCUMENTS

| | | | | |
|---|---|---|---|---|
| 4,757,348 A | * | 7/1988 | Rourke et al. | 399/84 |
| 4,970,554 A | * | 11/1990 | Rourke | 399/84 |
| 5,564,109 A | * | 10/1996 | Snyder et al. | 710/8 |
| 6,026,436 A | * | 2/2000 | Hawes | 709/218 |
| 2004/0221043 A1 | * | 11/2004 | Su et al. | 709/227 |
| 2004/0260822 A1 | * | 12/2004 | Fujiki | 709/229 |
| 2005/0105129 A1 | * | 5/2005 | Takahashi | 358/1.15 |
| 2006/0129694 A1 | * | 6/2006 | Ishida et al. | 709/238 |
| 2007/0055752 A1 | * | 3/2007 | Wiegand et al. | 709/220 |
| 2007/0266236 A1 | * | 11/2007 | Colditz | 713/153 |

* cited by examiner

*Primary Examiner*—Patrice Winder
*Assistant Examiner*—Azizul Choudhury
(74) *Attorney, Agent, or Firm*—Carter, DeLuca, Farrell & Schmidt, LLP

(57) ABSTRACT

A system and method are provided for forming a cluster of networked devices, such as multifunctional devices (MFDs), by scanning a configuration document. The configuration document is printed using a seed device and is scanned and read by one or more devices which are desired to join the cluster. The configuration document includes encoded data corresponding to the attributes and other characteristics of the seed device. Each device decodes the encoded data corresponding to the configuration document and determines if it is compatible with the seed device. If a device determines that it is compatible with the seed device and is thus able to share its resources with the seed device, and vice versa, the device can decide whether to join the cluster. The cluster self-administers itself; each device independently determines whether to leave the cluster, remain in the cluster, and rejoin the cluster.

14 Claims, 6 Drawing Sheets

SYSTEM AND METHOD FOR FORMING A CLUSTER OF NETWORKED DEVICES

BACKGROUND

This disclosure relates generally to a system and method for forming a cluster of networked devices. More particularly, this disclosure relates generally to a system and method for forming a peer-to-peer cluster of networked multifunctional devices (MFDs) by scanning a configuration document.

Networked devices, such as printers or multifunction devices (MFDs) having scanning capabilities, may be configured into clusters, where the devices in a cluster are physically proximal to one another. A user operating a first device on the network may request that a second device on the network perform a task. When the second device is included in a cluster, a program routine executed by a network server may direct the task or job to one of the devices in the cluster. The network may select the device from within the cluster based on device availability.

In particular, the user requests that a "virtual printer" perform the task, such as a print job. The "virtual printer" is not a real physical device, but rather a logical entity representing the cluster. Tasks sent to the "virtual printer" are then routed by the network server which operates the "virtual printer" to a real printer in the cluster using one of various techniques for scheduling known in the art, such as round-robin and least load.

However, configuration of a cluster of devices must be performed via the network server. Furthermore, each time that a device is added to or removed from the cluster, the cluster configuration on the server must be updated. Reconfigurations, updates and maintenance to a network server typically are performed by a network administrator having the associated expertise and network privileges. The network administrator also creates and administers the "virtual printer." Work performed on the network server may be disruptive to the network, and may require temporarily disabling the network. In general, the configuration of clusters on a network may be time consuming, expensive and disruptive.

Yet, the network administrator has the advantage deciding which devices should be in a cluster, such as by taking the physical location of the various devices to be clustered into account. For example, when establishing a cluster of printers, it is desirable for the cluster to include printers that are proximal to one another, so that when a print job is sent to a cluster or a printer on the cluster, upon redirection of the print job to another printer of the cluster, the user will have a general idea where the print job was printed. The printed output will be simple to locate and easy to get to, e.g., just a few steps away. Accordingly, the ability to decide which devices are to be included in a cluster of network devices, it is important to take the physical location of the devices into account.

Accordingly, there exists a need for establishing a cluster of networked devices without configuring or updating a network server.

SUMMARY

Accordingly, it is an aspect of the present disclosure to provide a system and method for forming a cluster of networked devices by scanning a configuration document. The configuration document is printed using one of the networked devices (seed device) and it contains in encoded form the attributes (network address, installed features, printing formats, scanning formats, etc.) and other characteristics of the seed device.

To form a cluster of networked devices, the configuration document is first printed using the seed device and is scanned and read by one or more devices which are desired to join the cluster. Each device decodes the encoded data corresponding to the configuration document and determines if it is compatible with the seed device. If a device determines that it is compatible with the seed device and is thus able to share its resources with the seed device and/or other devices of the cluster, and vice versa, the device decides whether to join the cluster.

One main advantage of the system and method according to the present disclosure is that there is no need for a centralized server or other mechanism/system to perform cluster administration. The cluster self-administers itself; each device independently decides whether to leave the cluster, remain in the cluster, and rejoin the cluster.

In accordance with one aspect of the present disclosure, there is provided a method for forming a cluster having at least two networked devices. The method includes providing a plurality of networked devices; producing a document using a networked device of the plurality of networked devices; imaging the document by at least one other networked device of the plurality of networked devices; extracting configuration data from the imaged document; and setting configuration information or parameters for at least one networked device of the plurality of networked devices using the extracted configuration data for forming the cluster having the at least two networked devices.

Pursuant to another aspect of the present disclosure, there is provided a device having and imaging apparatus operable to image a document; and a controller operable to extract configuration data from the imaged document, to decide whether for the device to join or form a peer-to-peer cluster having at least two devices, and if deciding to join or form the peer-to-peer cluster, to set configuration information or parameters of the device using the extracted configuration data.

Pursuant to still another aspect of the present disclosure, there is provided a computer readable medium storing program instructions executable by a processor of a device for imaging a document; extracting configuration data from the imaged document; deciding whether for the device to join or form a peer-to-peer cluster having at least two devices; and setting configuration information or parameters of the device using the extracted configuration data, if deciding to join or form the peer-to-peer cluster.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

A system and method are provided for forming a cluster of networked devices by scanning a configuration document. The cluster of devices is a peer-to-peer (P2P) cluster (cluster without a server). The cluster provides load balancing, improves the reliability of the network, and increases network throughput and lowers latency. It is desired for the cluster to include devices which are in close proximity to one another.

One main advantage of the system and method according to the present disclosure is that there is no need for a centralized server or other mechanism/system to perform cluster administration. The cluster self-administers itself; each device of the cluster independently decides whether to leave the cluster, remain in the cluster, and rejoin the cluster.

Figure 1:
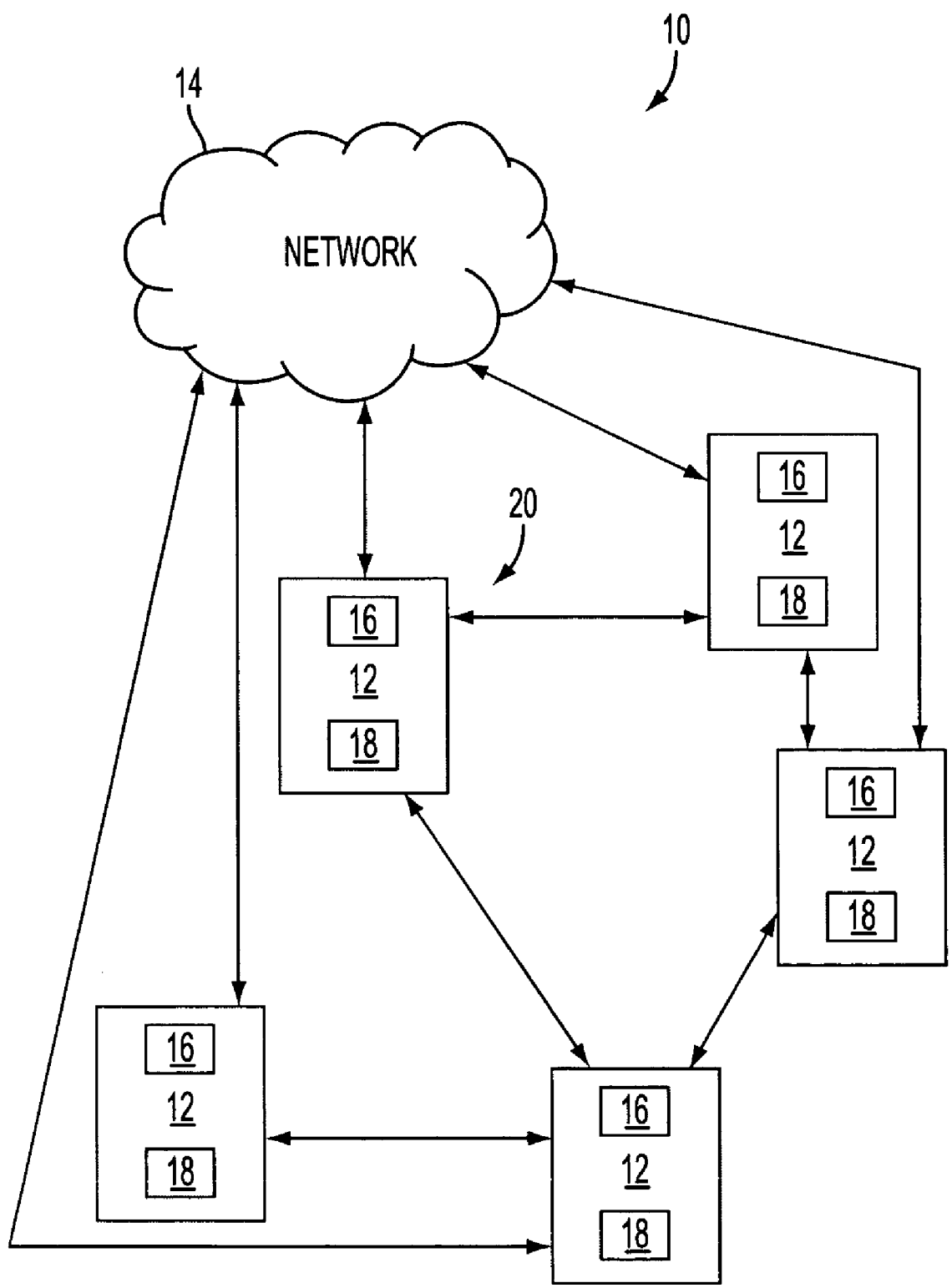
FIG. 1 is a schematic diagram of a cluster of networked devices in accordance with the present disclosure.

For a general understanding of the features of the present disclosure, reference is made to the drawings. In the drawings, like reference numerals have been used throughout to identify identical elements. With reference to FIG. 1, a cluster 10 is shown including individual devices 12, which can be multifunctional devices (MFDs) and/or other type of devices, which have been configured to form the cluster 10 in accordance with the present disclosure. Each device 12 is in operative communication (either wirelessly or hard-wired) to a network 14 and each device 12 is provided with a network address for enabling communication with other networked devices via the network 14.

A feature is added to one of the devices 12 which allows a configuration document to be printed which describes the setup and capabilities of the device 12 in digital-on-paper form. This device is referred to herein as the seed device and is identified generally by reference numeral 20 in FIG. 1.

The devices 12 each have a processor 16 (e.g., microprocessor and associated memory) and communication I/O circuitry 18 for communicating with other devices via the network 14. In the current example, the devices 12 are printers, including any device having printing capabilities; however, in the present disclosure the devices 12 are not limited to printers. The devices 12 may communicate via the network 14 with other devices that are included in the network 14 via the communication I/O circuitry 18, which may support wired or wireless communication. The devices 12 may have the same or different printing and/or computing capabilities relative to one another and the same or different configuration settings.

Figure 2:
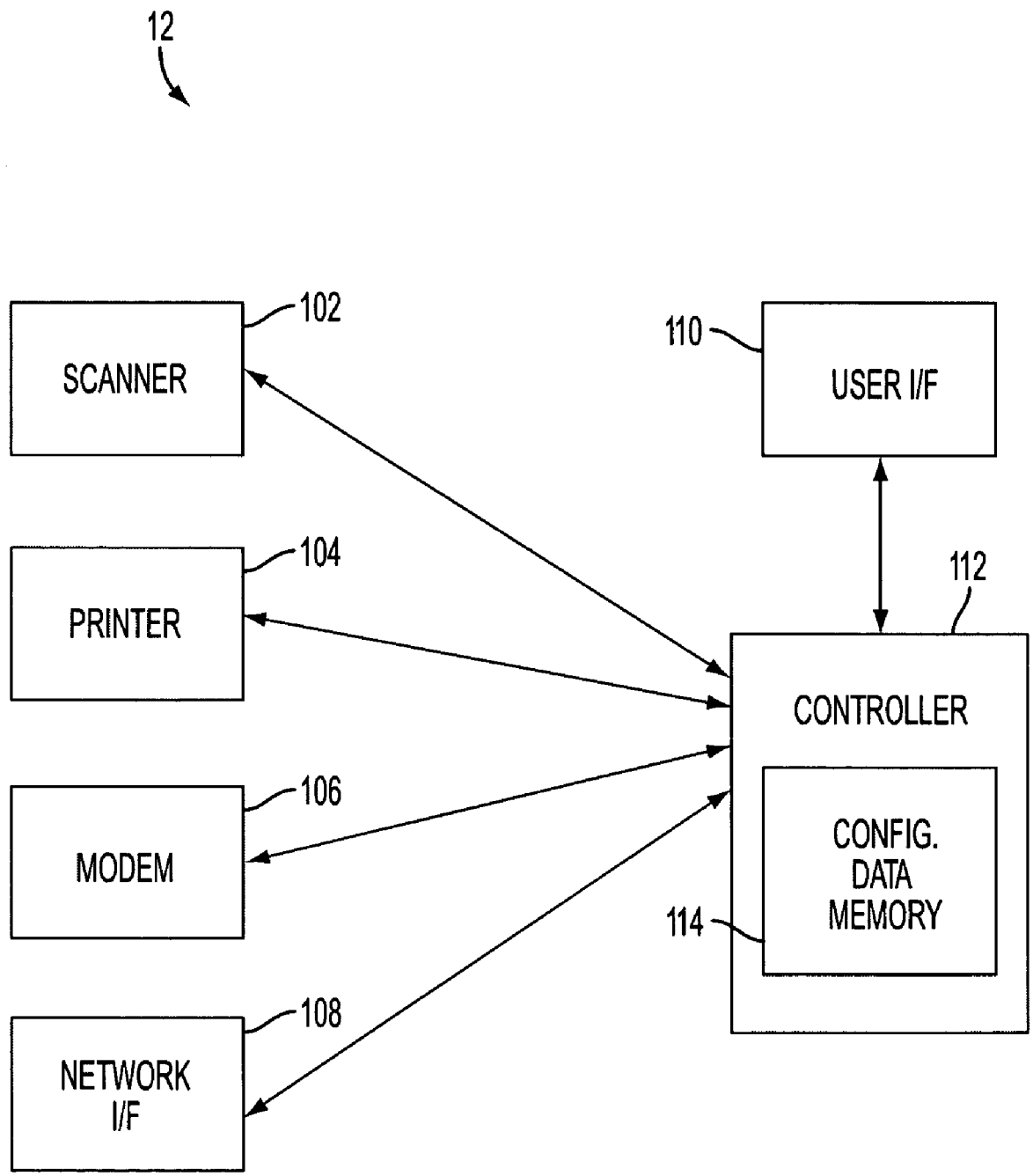
FIG. 2 is an exemplary diagram of a device to which the technology described in the present disclosure may be advantageously applied.

An exemplary illustration of a device 12, to which the present technology may be advantageously applied is shown in FIG. 2. It is to be noted that device 12, shown in FIG. 2, is merely an example of a system to which the present technology may be advantageously applied. The present technology is not limited to this system and in fact, contemplates application to and implementation in any type of system in which documents may be scanned and processed. Additional non-limiting examples of systems to which the present technology may be applied include xerographic or other photocopiers, which may include paper handlers, document finishers, etc., scanners, printers, fax machines, etc.

In the example shown in FIG. 2, the device 12 is a multi-functional device and includes a number of components, such as a scanner 102, a printer 104, a modem 106, a network interface 108, a user interface 110, etc. The modem 106, the network interface 108 and the user interface 110 are collectively part of the communication I/O circuitry 18. Typically, the various components of the device 12 are controlled by at least one controller 112, which may be the processor 16, which controls the operation of each component in order to perform the functions of the device 12.

The controller 112 also stores configuration parameter settings in configuration data memory 114. The scanner 102 may be used to scan in images of documents, drawings, photographs, etc., the printer 104 may be used to generate documents, drawings, photographs, etc., the modem 106 may be used to transmit and/or receive data such as fax data, data representing documents, drawings, photographs, etc., over telephone lines, and network interface 108 may be used to transmit and/or receive data such as fax data, data representing documents, drawings, photographs, etc., over a data communication network.

In addition to individual functions performed by each component, the device 12 may use more than one component in order to perform a device wide function. For example, the device 12 may use the scanner 102 and the modem 106 in order to transmit a fax; the modem 106 and the printer 104 in order to receive a fax; the scanner 102 and the printer 104 in order to copy a document; the scanner 102 and network interface 108 in order to scan a document; etc.

In order to perform these functions, each component and/or device must be configured based on the desired functions. Configuration does not involve the control of a component or device during operation of the component or device. Rather, configuration involves setting up a component or device with information needed to perform a function, parameters that defined characteristics of the function, etc., that are needed before the component or device can perform a particular function or set of functions. In order to configure a component or a device, the information needed to perform at least some of the functions must be provided based on the desired functions. Likewise, the parameters that define the characteristics of at least some of the functions that the component or device is to perform must be set to appropriate values based on the desired functions. For example, scanner 102 requires configuration of parameters such as scan resolution (dots per inch), scan depth (bits per dot), format of scanned data, etc. Printer 104 requires configuration of parameters such as print resolution (dots per inch), print depth (bits per dot), format of print data, etc. Modem 106 requires configuration of parameters such as data rate, data format, data transfer protocol, etc. Network interface 108 requires configuration of parameters such as data rate, data format, data transfer protocol, etc. In addition, device 12 requires configuration for device wide functions. For example, in order to transmit a fax, both scanner 102 and modem 106 must be configured, and data, such as the telephone numbers to which the fax is to be sent, must be configured. In order to copy a document, data, such as the copy resolution, the document size, and the number of copies, must be configured.

One way of entering the required configuration information is using user interface 110. Typically, the user enters configuration parameters using a keypad and observes the settings on a display. While this technique may be adequate for simple configuration settings, another technique entails scanning a configuration document as disclosed in U.S. patent application Ser. No. 11/154,601 filed on Jun. 17, 2005 and titled MACHINE SETUP BY SCANNING A CONFIGURATION SHEET; the entire contents of the patent application are incorporated herein by reference. According to this patent application, the user may enter configuration setting of arbitrary complexity simply and easily by scanning in one or more configuration documents into device 12. The configuration setting data represented on the configuration documents is extracted and the configuration setting data is stored in configuration data memory 114.

Figure 3:
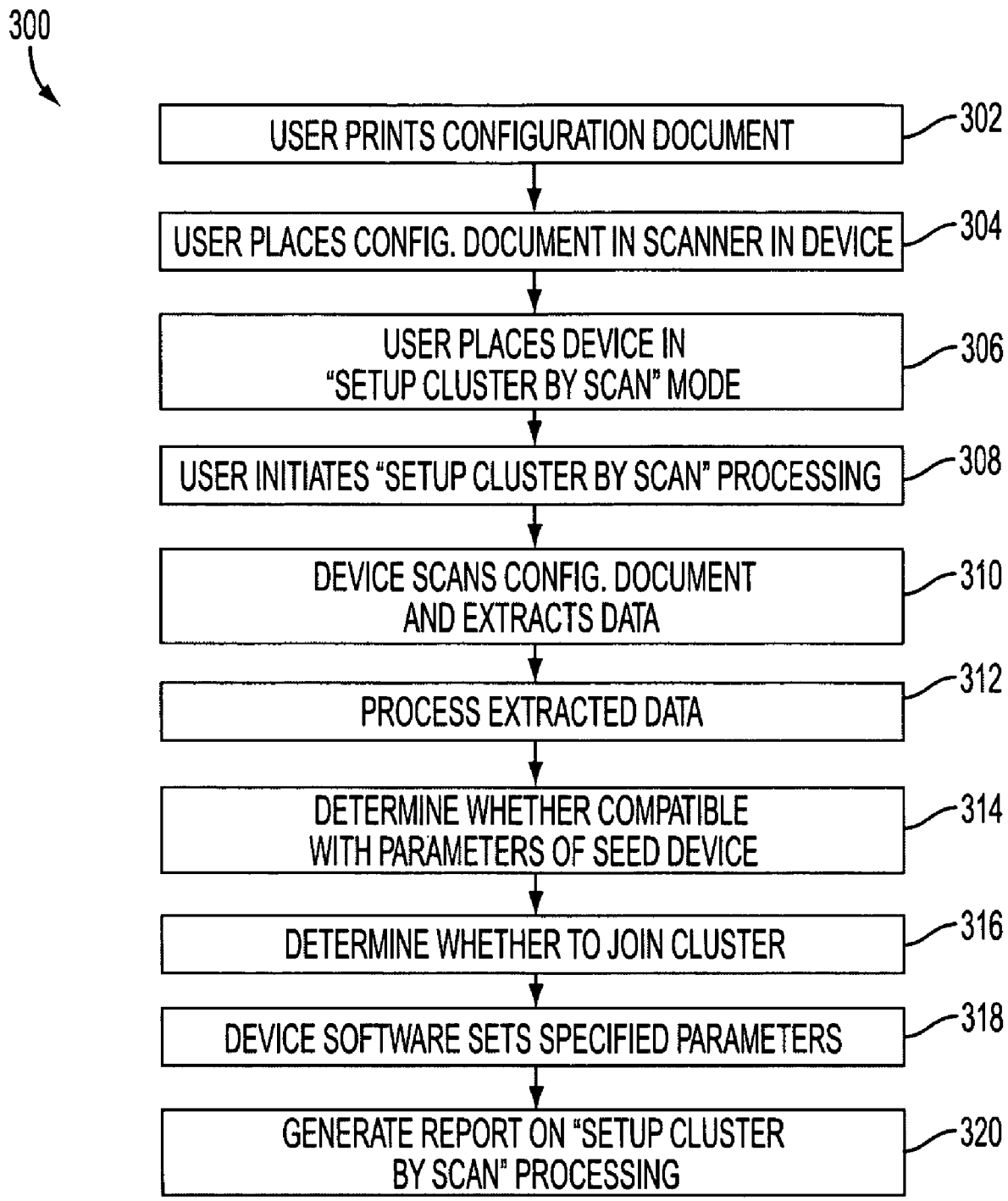
FIG. 3 is an exemplary flow diagram of a process of scanning a configuration document and forming a cluster of networked devices in accordance with the present disclosure.
Figure 4:
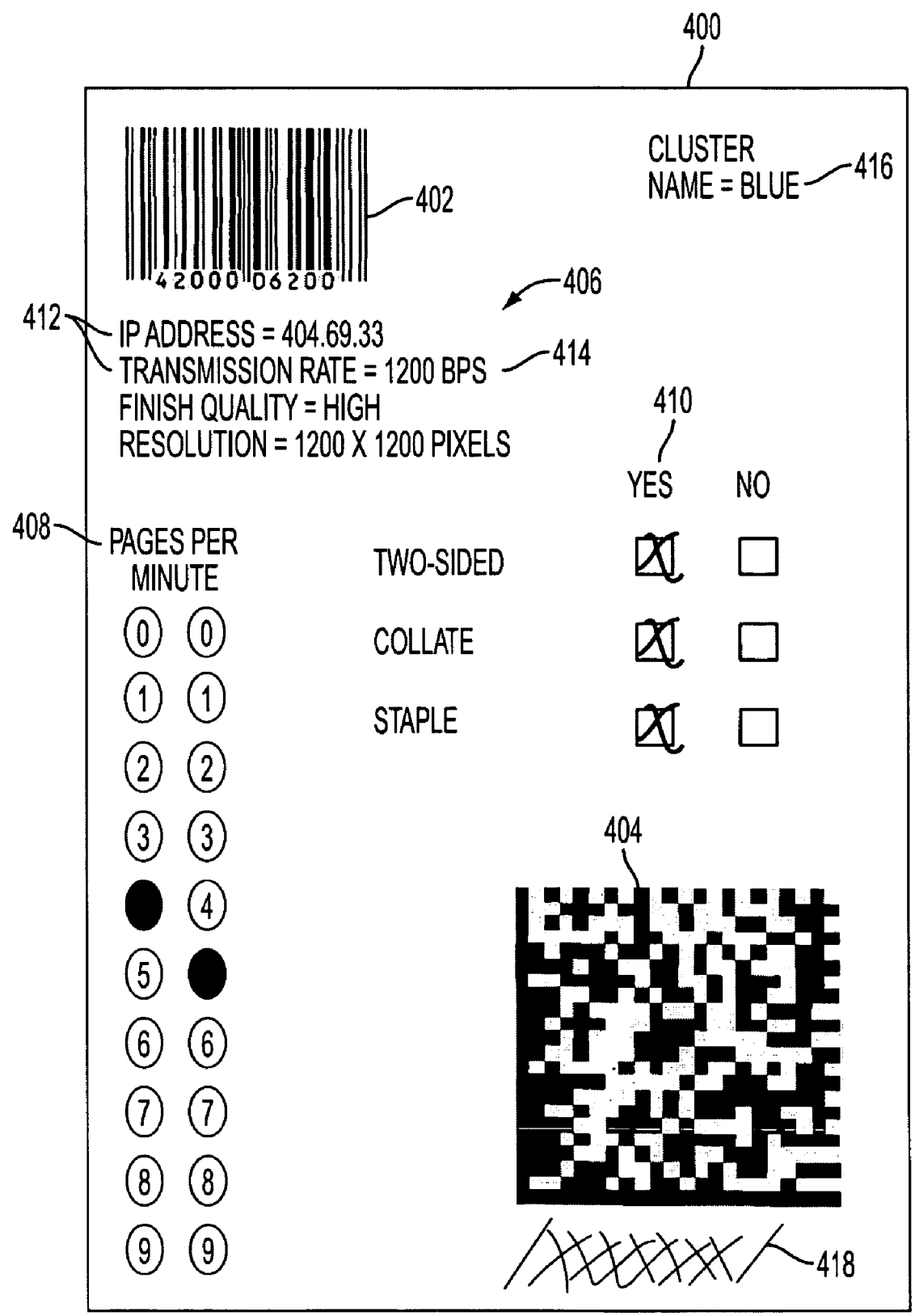
FIG. 4 is an exemplary illustration of a configuration document in accordance with the present disclosure.

An exemplary flow diagram of a process 300 of forming a peer-to-peer cluster by scanning a configuration document 400 (see FIG. 4) printed by the seed device 20 is shown in FIG. 3 and described below. The configuration document 400 may be a single sheet as shown by FIG. 4, or the configuration document 400 may be multiple sheets. The configuration document 400 contains in encoded form the attributes (network address, installed features, printing formats, scanning formats, etc.) and other characteristics of the seed device 20, such as make and model of the seed device 20. The encoded attributes can be encoded using various encoding schemes, such as DataGlyphs™ and one- and two-dimensional symbologies, such as UPC and PDF417 symbologies.

With more particularity, the configuration document 400 describes both the network configuration of the seed device 20 and the installed capabilities of the seed device 20, such as, for example, print job description formats (PDF, PCL, PostScript, etc.) supported by the seed device 20; precise versions of those formats (PostScript level, PDF version, etc.) supported by the seed device 20; job ticket formats (Xerox job ticket, JDF, etc.) supported by the seed device 20; the finishing features (duplex, collate, staple, etc.) programmed and/or installed on the seed device 20; and all other capabilities of the seed device 20. The information included by the configuration document 400 must be sufficient to enable a device 12 to automatically determine whether or not it can perform a job, such as a print job, in one of the specified formats. This is important for forming the cluster 10, since only compatible devices 12 can pool resources.

The configuration document 400 also contains in encoded or non-encoded form a unique name 416 for the cluster 10, such that devices 12 that join the cluster 10 know the unique name 416 of the cluster 10 they belong to. Therefore, the present technology establishes the cluster name 416 and ensures compatibility between the devices 12 which join the cluster 10.

The unique name 416 is generated by the seed device 20. The unique name 416 can be generated using a Globally Unique Identifier (GUID) and other unique characteristics of the seed device 20. It is contemplated that the unique name 416 is encoded using various encoding schemes, such as DataGlyphs™ and one- and two-dimensional symbologies, such as UPC and PDF417 symbologies, prior to printing the configuration document 400. It is also contemplated that the unique name 416 can be printed in text form as shown by the configuration document 400 illustrated by FIG. 4.

The configuration document 400 further includes a digital signature 418 created by using any well-known digital signature scheme. The digital signature 418 provides an integrity guarantee. That is, any device 12 which scanned the configuration document 400 can verify by processing the digital signature 418 that the configuration document 400 is the product of the present technology described herein, and that it provides an accurate description of the seed device 20 which printed the configuration document 400.

With reference to FIG. 3, process 300 begins with Step 302 where the configuration document 400 is printed using the seed device 20. At Step 304, the user places the configuration document 400 in a scanner component of a device 12 which is desired to join the cluster 10. The user may place the configuration document 400 in a document feeder or on a document glass of the scanner component of the device 12. The scanner component may be a stand-alone scanner, a scanner portion of a fax machine, copier, multi-function device, etc., or any other arrangement of a component that is capable of imaging a document. The process then proceeds to Step 306.

At Step 306, the user places the device 12 which is desired to join the cluster 10 in "setup cluster by scan" mode. This can be done by pressing a button, such as a separate button on the device 12 desired to join the cluster 10 or on a component of, or connected to, the device 12 desired to join the cluster 10, or by operating a user interface to place the device 12 in the correct mode. However, any arrangement by which the user may place the device 12 desired to join the cluster 10 into the "setup cluster by scan" mode is contemplated.

At Step 308, the user initiates the "setup cluster by scan" processing using a built-in administrative procedure of the device 12. This is done by pressing a button, such as a separate button on the device 12 desired to join the cluster 10 or on a component of, or connected to, the device 12 desired to join the cluster 10, or by operating a user interface to initiate the processing. However, any arrangement by which the user may initiate the "setup cluster by scan" processing is contemplated. For example, the device 12 may require confirmation and/or entry of a username and/or a password, possibly using a security domain such as Microsoft Active Directory or some other network-based security and authorization infrastructure, before the settings may be changed. Authentication and authorization may be used to restrict the ability to change certain settings of the device 12, such as administrator settings for the device 12 or settings for certain subsystems. For example, the configuration document 400 may include settings for multiple subsystems of the device 12 when only a subset of the settings are needed, or the configuration document 400 may include a mix of ordinary user and administrator settings. In such cases, authentication and authorization would provide a way to prevent unauthorized configuration changes.

At Step 310, the device 12 desired to join the cluster 10 scans the configuration document 400 and extracts configuration data. This may be done in a number of ways, depending upon the technique used to encode the configuration data onto the configuration document 400. Turning again to FIG. 4, examples of encoding of configuration data on a configuration document 400 are shown. For example, the configuration data may be encoded on the configuration document 400 as one-dimensional barcode information 402 or two-dimensional barcode information 404 and the configuration data may be extracted by a barcode recognition process. The configuration data may be encoded on the configuration document 400 as text information 406 and the configuration data may be extracted by an optical character recognition process. The configuration data may be encoded on the configuration document 400 as spatial indicia encoded information, such as fill-in bubbles 408 or check boxes 410 and the configuration data may be extracted by spatial data extraction process.

The configuration data may be encoded on the configuration document 400 in data pair including a parameter identifier (ID) and a value to which the identified parameter is to be set. For example, text information 406 includes a number of parameters to be set, each including a parameter ID, such as parameter ID 412, and a parameter value, such as parameter value 414. The extracted parameter ID is used to identify the parameter to be set and the extracted parameter value is used to set the identified parameter. These are merely examples of encoding/decoding techniques that may be used. Any technique by which data may be encoded onto a document and any corresponding technique by which the encoded data may be extracted from the document is contemplated.

Returning to FIG. 3, after scanning the configuration document 400 by one or more devices 12 to extract the configuration data, or one or more devices 12 are provided with the configuration data via the network, at Step 312 each device 12 decodes the configuration data and at Step 314, each device 12 determines if it is compatible with the seed device 20. Compatibility is determined individually by each device 12 by analyzing the parameters of the seed device 20. These parameters can include, for example, print job description formats (PDF, PCL, PostScript, etc.) supported by the seed device 20; precise versions of those formats (PostScript level, PDF version, etc.) supported by the seed device 20; job ticket formats (Xerox job ticket, JDF, etc.) supported by the seed device 20; the finishing features (duplex, collate, staple, etc.) programmed and/or installed on the seed device 20; and all other capabilities of the seed device 20 set forth by the configuration document 400. These and other features/characteristics of the seed device 20 are encoded and printed on the configuration document 400 as shown by FIG. 4.

If the device 12 determines at Step 314 that it is compatible with the seed device 20 and is thus able to share its resources with the seed device 20 and/or other devices 12 in the cluster 10, and vice versa, the device 12, at Step 316, decides whether to join the cluster 10. Each device 12 independently determines whether to join the cluster 10 by having its controller 112 execute a set of instructions. For example, by executing the set of instructions, the controller 112 determines whether its corresponding printing device 12 has adequate resources (paper stock, toner, etc.) to be able to be a productive member of the cluster 10; determines whether its corresponding printing device 12 is due for maintenance in the immediate future; determines whether its corresponding printing device 12 will be able to share its resources with the printing devices 12 in the cluster 10 within a predetermined time period, e.g., within five minutes after joining the cluster 10; etc.

If at Step 316 the device 12 decides to join the cluster 10, then at Step 318 the extracted configuration data, or received, extracted configuration data is used to set configuration parameters for the device 12 such that the device 12 joins the peer-to-peer cluster 10 and is able to share its resources with the devices 12 in the cluster 10. The configuration parameters are stored in one or more data structures in configuration memory 114, shown in FIG. 2, or elsewhere in the device 12.

Figure 5:
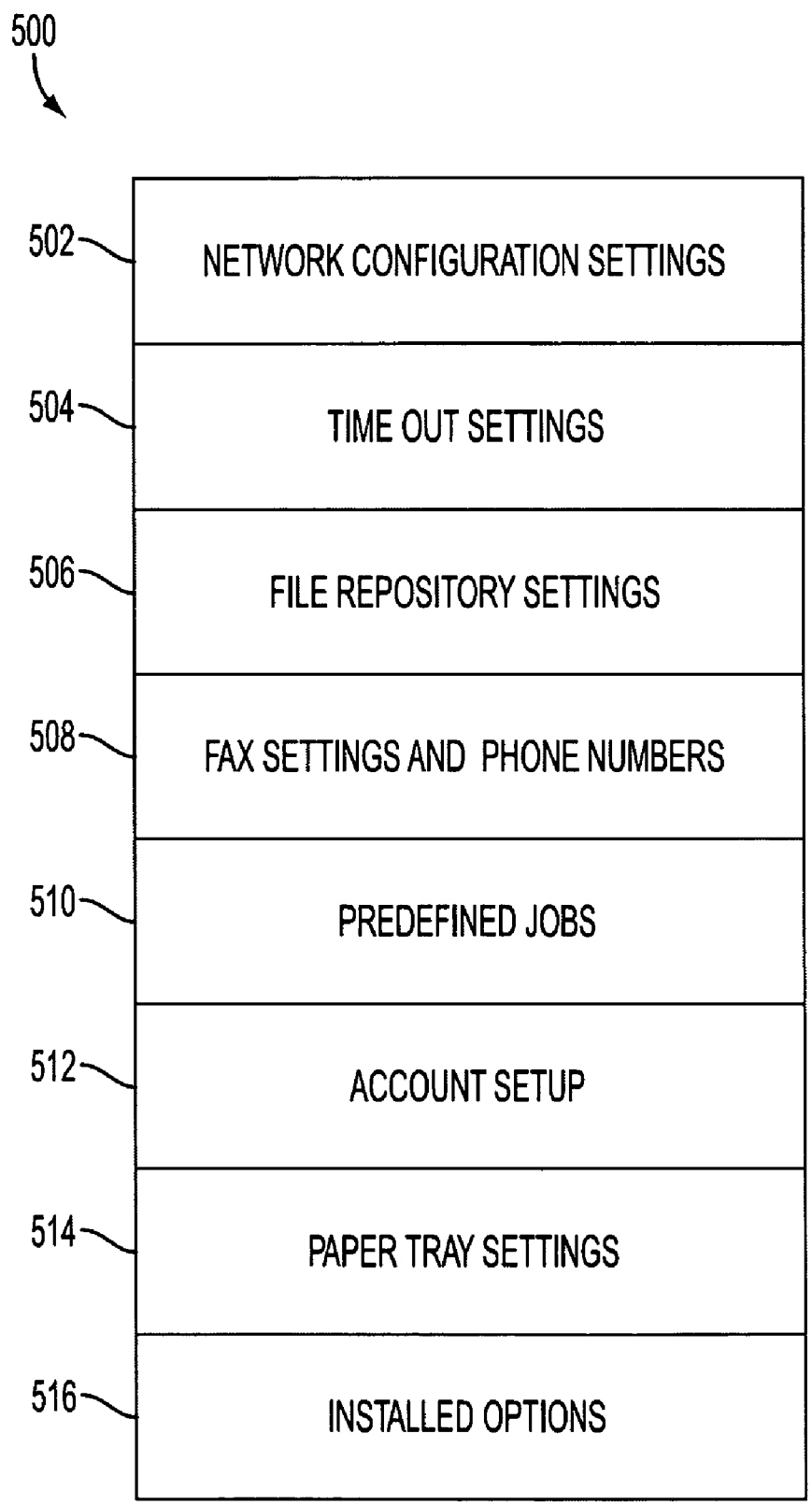
FIG. 5 is an exemplary format of a data structure that may store configuration data in accordance with the present disclosure.

An example of such a data structure is shown by FIG. 5. In the example shown in FIG. 5, data structure 500 includes storage for network configuration settings 502, time out settings 504, file repository settings 506, fax settings and phone numbers 508, predefined jobs 510, account setup 512, paper tray settings 514, installed options 516, etc. Network configuration settings 502 may include parameters such as IP address, protocol enable, Host Name, Subnet Mask, Default Gateway, DNS Server, Alternate DNS servers, Raw TCP/IP address, Novel Networking Settings, AppleTalk Enablement, AppleTalk Device Name, Microsoft Networking Enablement, MS Networking SMB Host Name, HTTP Enablement, HTTP Port Number, Email SMTP, LDAP and POP3 settings to support features such as scan to email when present, USB port settings, etc.

Time out settings 504 may include parameters such as inactivity timeouts, lack of response timeouts, time until job being setup reverts to default job if setting have not changed, wait time after Nth unsuccessful login, Power Saver activation time, morning power up schedule, etc. File repository settings 506 may include parameters to support Scan to File Features such as protocols allowed, server names, directory paths, Login names, etc.

Fax settings and phone numbers 508 may include parameters such as Fax phone line selection, recipient Fax number list, etc. Predefined jobs 510 may include parameters such as job settings for a number of predefined jobs that can be recalled with a menu or hot key process, such as copy, fax, scan to file, and other jobs. Account setup 512 may include parameters such what accounting method(s) are enabled, who can be an administrator, how many accounts are provided, initial account setups items such as maximum impressions allowed, job types permitted, usage information of the device, etc. Paper tray settings 514 may include parameters such as Media Size, Media Color, Media Orientation, Media Type, etc. Installed options 516 may include parameters such as what options are installed, what options are enabled, etc.

These are merely examples of types of parameters that may be configured in accordance with the present disclosure. The setting of any parameters that may be relevant to any function or task to be performed by the device 12 of the peer-to-peer cluster 10 is contemplated.

With reference to FIG. 3, at Step 320, a report on the "setup cluster by scan" processing is generated. The report may indicate success or failure of the device 12 joining the cluster 10, conflicts or errors in the configuration parameters of the device 12 which causes the device 12 not to be compatible with the seed device 20, etc.

According to the present disclosure, compatibility among devices 12 is determined by the devices 12 themselves, rather than by administrators. This reduces administrative errors, burdens and cost, and greatly simplifies clustering of the devices 12. Moreover, each device 12 in the cluster 10 is able to accept and perform jobs transmitted from other devices 12 of the cluster 10 due to failover and load balancing without user intervention.

In particular, the cluster 10 is able to manage job allocation and other device functions, such as printing functions by transmitting communication signals having at least one network address and the unique cluster name between the various devices 12 of the cluster 10. In an exemplary process for performing a print job, a device 12 of the cluster 10 receives the print job and the unique cluster name from a job originating device 12 of the cluster 10. If the receiving device 12 determines it is a member of the same cluster 10 as the job originating device 12 by analyzing the received unique cluster name, the receiving device 12 then determines whether to perform at least a portion of the print job, and if yes, notifies the job originating device 12 and the other devices 12 in the cluster of its decision via a multi-cast transmission. If the receiving device 12 determines not to perform the print job, the receiving device 12 notifies the job originating device 12 of its decision and could also state the reasons for its decision (e.g., low on paper stock, currently performing a large job, etc.). The receiving device 12 can then use peer-to-peer techniques for transmitting the print job to one or more other devices 12 in the cluster 12, unless the transmitting device 12 transmitted the print job via a multi-cast transmission to all the devices 12 in the cluster 10.

It is contemplated that a user, who originated the job and transmitted the job to one or more of the devices 12 of the cluster 10, is notified of which device(s) 12 performed the job. Notification can be provided by email, page, telephone call, text message, pop-up window visually displayed on a terminal corresponding to the user, audio signal being transmitted from the device(s) 12, etc. The notification enables the user to identify the device(s) which performed the job and quickly retrieve the printed documents from the one or more of the devices 12 of the cluster 10 which performed the job.

Using the methodology of the present disclosure, an administrator or other user can add additional devices 12 to an existing cluster at any time by at least scanning the printed configuration document into the device 12 desired to join the cluster, even if the seed device 20 is no longer a member of the cluster.

A device 12, after joining the cluster 10, can leave and rejoin the cluster 10 at will. Hence, the number of devices 12 belonging to the cluster 10 increases and decreases dynamically and no device 12 in the cluster 10 at any given time need know the current list of other devices 12 in the cluster 10. The controller 112 decides whether its corresponding device 12 should leave the cluster 10 if the device 12 is running low on resources, such as paper stock, toner, etc.; if the controller 112 decides that its corresponding device 12 has been overused during a predetermined time period; etc.

The device 12 can also be manually operated for leaving and rejoining the cluster 10. For example, a user can manually cause the device 12 to leave or join the cluster by pressing a button of the user interface 110 or transmitting a signal to the device 12 from another device. It is contemplated that the user can also manually program a device 12 via the user interface 110 to prevent the device 12 from joining a cluster, leaving a cluster, and rejoining a cluster.

The user interface 110 can also be used to manually switch the device 12 from one cluster to another. The user can enter the unique cluster name which the user desires the device 12 to join using a keyboard of the user interface 110, or scrolling a list of cluster names using a visual display and a scrolling member and selecting one of the cluster names. It is contemplated that after a device 12 is powered up, the device 12 automatically joins the cluster 10 it was a member of prior to being powered down. As such, the controller 112 stores in memory the unique name 416 of the cluster 10 even after the device 12 is powered down, for say, maintenance purposes.

The cluster 10 continues to exist with the same unique user name even if the seed device 20 leaves the cluster 10 (for example, due to failure). The unique name 416 of the cluster 10 generated by the seed device 20 can be used by devices 12 belonging to the cluster 10 for communicating between external devices 12 (non-cluster devices 12) and other devices.

The configuration document 400 may be created in a number of ways. For example, the configuration document 400 may be created interactively by a dedicated computer program. Such a program would typically provide a user interface with which a user could select configuration parameters, scripts, etc., and would then output the scannable configuration document 400, typically by printing it. Likewise, the configuration document 400 may be created using a general purpose program, such as a text editor. In this case, the output may be text, which is useful with devices 12 that include optical character recognition capabilities. As another example, the configuration document 400 may be generated by a device 12 to memorialize its current configuration settings. This configuration document 400 may then be used to configure the same device at a later time, to configure one or more other devices without forming a cluster, or to be used to configure one or more other devices to form a cluster.

Figure 6:
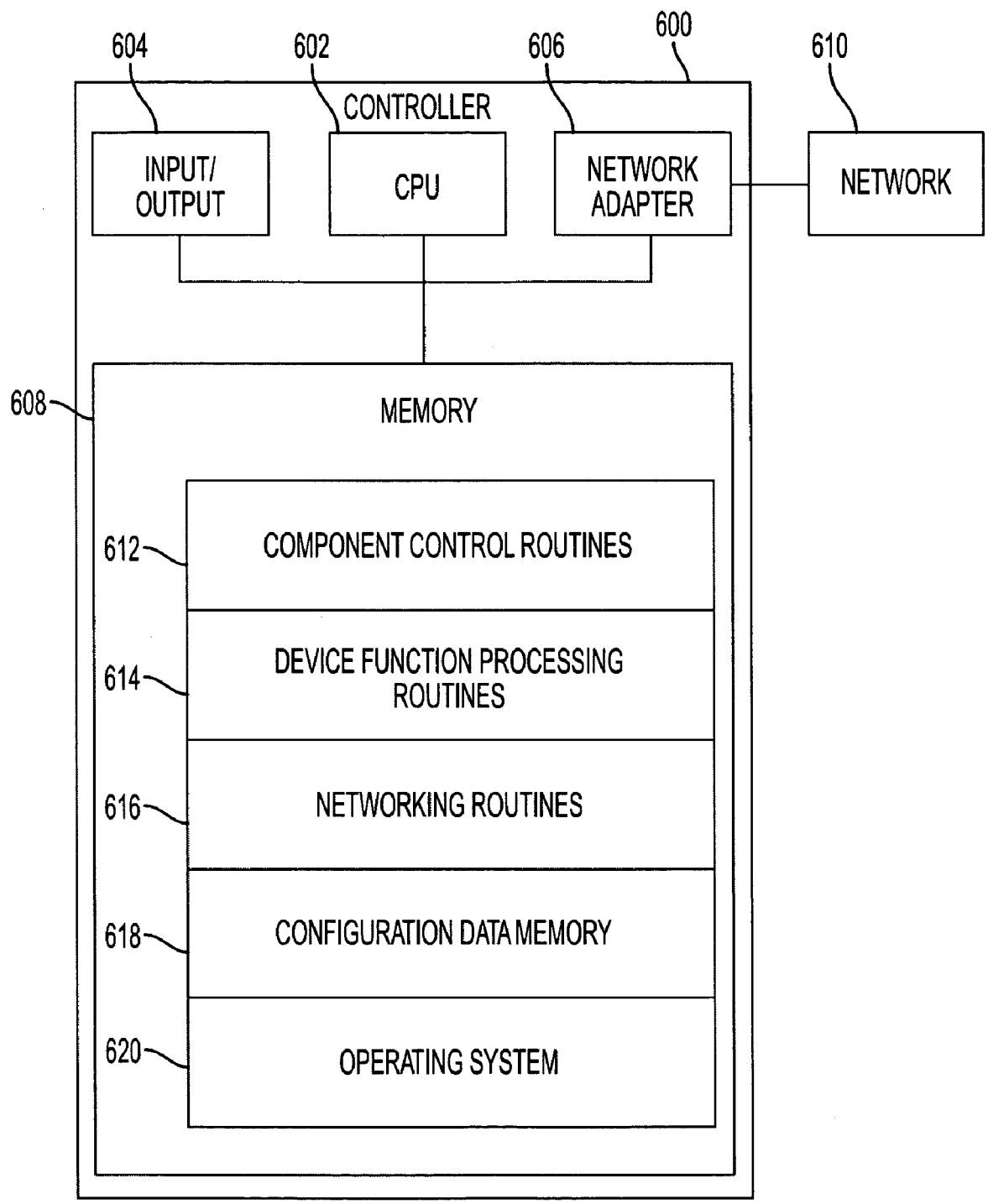
FIG. 6 is an exemplary block diagram of a controller for a device in which the technology described in the present disclosure may be implemented.

A block diagram of an exemplary controller 600, which may control the functionality of a device, such as device 12 shown in FIG. 2, is shown in FIG. 6. The controller 600 is typically a microcontroller or single-chip computer system, but may be a programmed general-purpose computer system, such as a personal computer, workstation, server system, and minicomputer or mainframe computer. The controller 600 includes processor (CPU) 602, input/output circuitry 604, network adapter 606, and memory 608. CPU 602 executes program instructions in order to carry out the functions in accordance with the present disclosure. Although in the example shown in FIG. 6, the controller 600 is a single processor computer system, the present disclosure contemplates implementation on a system or systems that provide multi-processor, multi-tasking, multi-process, multi-thread computing, distributed computing, and/or networked computing, as well as implementation on systems that provide only single processor, single thread computing. Likewise, the present disclosure also contemplates embodiments that utilize a distributed implementation, in which the controller 600 is implemented on a plurality of networked computer systems or microcontrollers, which may be single-processor computer systems, multi-processor computer systems, or a mix thereof.

Input/output circuitry 604 provides the capability to input data to, or output data from, the controller 600. For example, input/output circuitry may include input devices, such as keyboards, mice, touchpads, trackballs, scanners, etc., output devices, such as video adapters, monitors, printers, etc., and input/output devices, such as, modems, etc. The network adapter 606 interfaces the controller 600 with the network 610. The network 610 may be any standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions in accordance with the present disclosure. The program instructions can also be stored on a computer readable medium, such as a DVD, CD-ROM, 3.5' diskette, etc. and downloaded to memory 608. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA) or SATA (Serial ATA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes component control routines 612, device function processing routines 614, networking routines 616, configuration data memory 618, and operating system 620. Component control routines 612 provide the capability for the controller 600 to control the operation of individual components of the device, such as the device 12 and components shown in FIG. 2. Device function processing routines 614 provide the capability for the controller 600 to control the operation of the overall device 12, in addition to the individual components. Networking routines 616 provide the capability for the controller 600 to communicate with other controllers that may be included in the device 12 and in the individual components, as well at the capability for the device 12 to communicate with other devices 12. Configuration data memory 618 provides storage for configuration data and parameters that control the operation and functionality of the device 12. Operating system 612 provides overall system functionality.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof. The word "printer" and "device" as used herein encompasses any apparatus, such as a photocopier, a xerographic photocopier, a scanner, a printer, a xerographic printer, a fax machine, a xerographic fax machine, a multi-function device, or a xerographic multi-function device.

The invention claimed is:

1. A method for forming a cluster having at least two networked devices comprising:
   providing a plurality of networked devices;
   producing a document using a networked device of the plurality of networked devices;
   imaging the document by at least one other networked device of the plurality of networked devices;
   extracting configuration data from the imaged document;
   setting configuration information or parameters for the at least one other networked device of the plurality of networked devices using the extracted configuration data for forming the cluster having the at least two networked devices; and determining for each of said networked devices whether to join the cluster based on whether said networked device has adequate resources.

2. The method of claim 1, wherein each device is selected from the group consisting of a photocopier, a xerographic photocopier, a scanner, a printer, a xerographic printer, a fax machine, a xerographic fax machine, a multi-function device, and a xerographic multi-function device.

3. The method of claim 1, wherein the cluster is a peer-to-peer cluster.

4. The method of claim 1, wherein the cluster having the at least two networked devices do not include the networked device.

5. The method of claim 1, further comprising each of said plurality of networked devices not belonging to the cluster analyzing the extracted configuration data and determining whether to join the cluster.

6. The method of claim 5, further comprising each of said plurality of networked devices which joined the cluster deciding whether to leave the cluster.

7. The method of claim 5, further comprising each of said plurality of networked devices which joined the cluster and subsequently left the cluster deciding whether to rejoin the cluster.

8. The method of claim 1, wherein the document includes a name for the cluster, wherein the at least two networked devices of the cluster transmit communication signals which include the name of the cluster, and wherein the communication signals enable a device of the plurality of networked devices receiving the communication signals to determine if it belongs to the cluster identified by the communication signals.

9. The method of claim 1, further comprising providing notification to a user indicating at least one networked device of the at least two networked devices of the cluster which performed a job.

10. The method of claim 1, wherein the configuration data on the document is provided using at least one of a one-dimensional barcode, a two-dimensional barcode, text, and spatial indicia.

11. A computer readable medium storing program instructions executable by a processor of a device for:
    producing a document using a networked device of a plurality of networked devices;
    imaging the document by at least one other networked device of the plurality of networked devices;
    extracting configuration data from the imaged document;
    setting configuration information or parameters for the at least one other networked device of the plurality of networked devices using the extracted configuration data for forming the cluster having the at least two networked devices; and
    determining for each of said networked devices whether to join the cluster based on whether said networked device has adequate resources.

12. The computer readable medium of claim 11, wherein the device is selected from the group consisting of a photocopier, a xerographic photocopier, a scanner, a printer, a xerographic printer, a fax machine, a xerographic fax machine, a multi-function device, and a xerographic multi-function device.

13. The computer readable medium of claim 11, wherein the document includes a name for the cluster, wherein the device belonging to the cluster transmits communication signals which include the name of the cluster, and wherein the communication signals enable another device receiving the communication signals to determine if it belongs to the cluster identified by the communication signals.

14. The computer readable medium of claim 11, further comprising providing notification to a user indicating at least one device of the at least two devices of the cluster which performed a job.

* * * * *